Aug. 23, 1966 J. S. COLLMAN ETAL 3,267,674
REGENERATIVE GAS TURBINE
Filed April 21, 1964 5 Sheets-Sheet 1

INVENTORS
John S. Collman,
Eugene E. Flanigan,
James M. Ricketts,
William A. Turunen, &
BY Paul T. Vickers
Paul Fitzpatrick
ATTORNEY INVENTORS
John S. Collman
Eugene E. Flanigan,
James M. Ricketts,
William A. Turunen, &
Paul T. Vickers
BY Paul Fitzpatrick
ATTORNEY

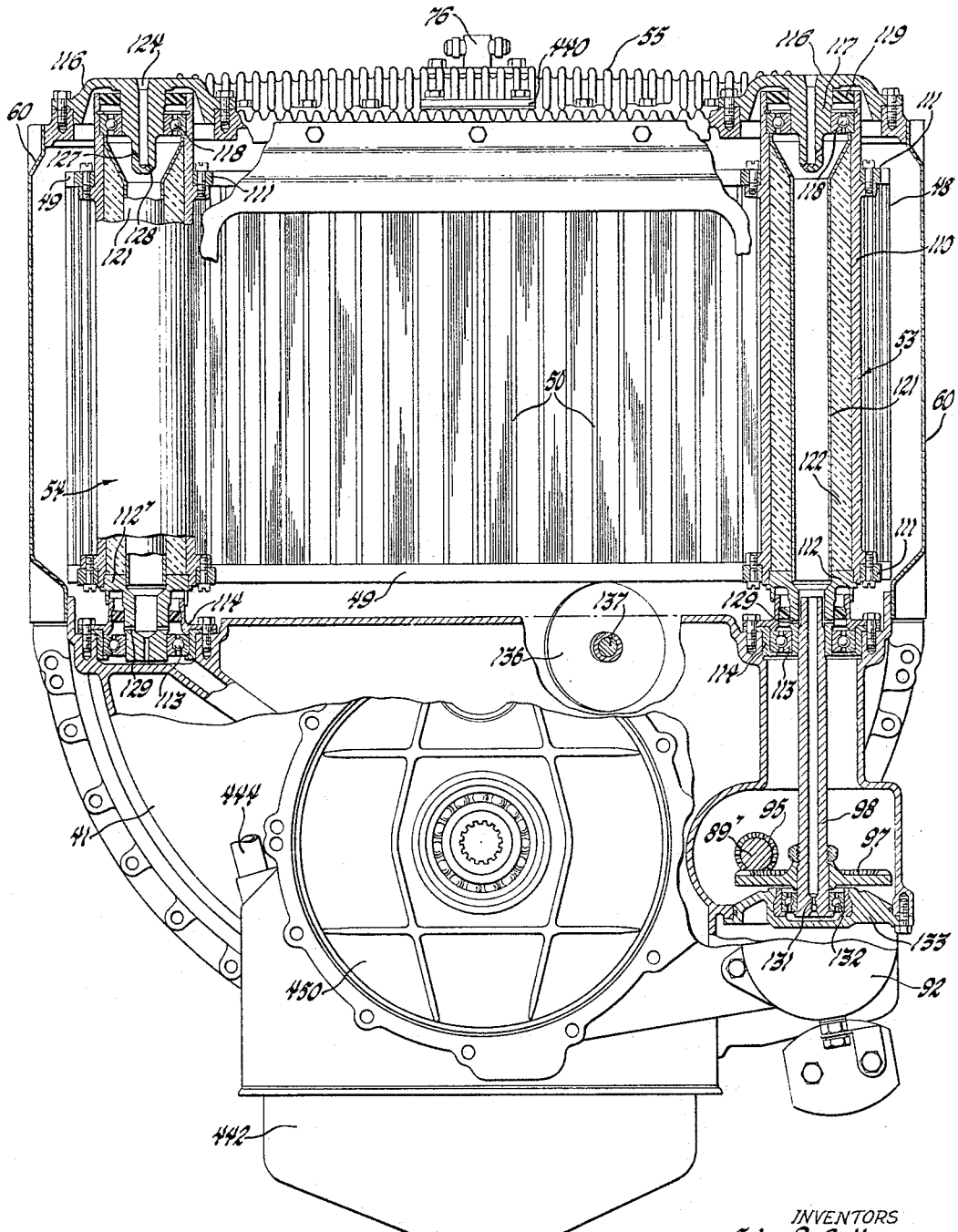

Aug. 23, 1966 — J. S. COLLMAN ETAL — 3,267,674
REGENERATIVE GAS TURBINE
Filed April 21, 1964 — 5 Sheets-Sheet 4

INVENTORS
John S. Collman,
Eugene E. Flanigan,
James M. Ricketts,
William A. Turunen, &
Paul T. Vickers
BY Paul Fitzpatrick
ATTORNEY

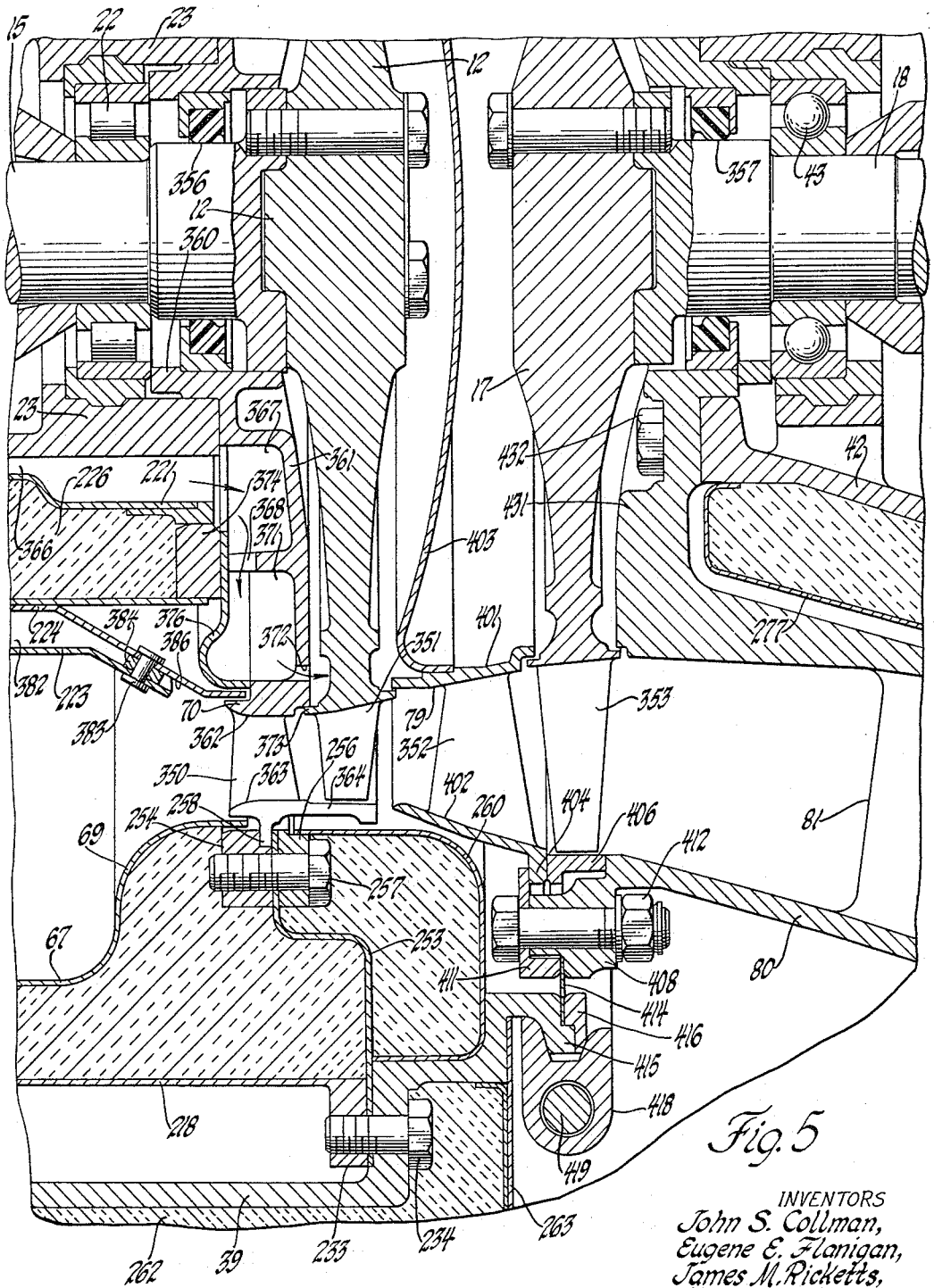

United States Patent Office 3,267,674
Patented August 23, 1966

3,267,674
REGENERATIVE GAS TURBINE
John S. Collman, Orchard Lake, Eugene E. Flanigan, Bloomfield Hills, James M. Ricketts, Oxford, William A. Turunen, Birmingham, and Paul T. Vickers, Royal Oak, Mich., assignors to General Motors Corporation, Detroit, Mich., a corporation of Delaware
Filed Apr. 21, 1964, Ser. No. 361,444
14 Claims. (Cl. 60—39.51)

Our invention relates to gas turbine engines of the regenerative type and is directed to providing an engine which is better suited to the requirements of practice and to commercial exploitation than previous engines of this sort. It is generally appreciated that the gas turbine has many advantages as a prime mover, and this is particularly true of regenerative gas turbines because the fuel economy is comparable with that of internal combustion engines. Progress has been made in improving the responsiveness and reliability of such engines, but presently the cost remains so high as to be more or less prohibitive of wide exploitation.

Our invention provides a regenerative gas turbine particularly suited to fabrication at reasonable cost and having characteristics favorable to use in road vehicles.

By way of background, attention may be directed to prior engines of the regenerative type which are the precursors of the present engine. These were engines introduced in 1956 and subsequently, the structures of which are described in the following patent disclosures, which also describe certain mechanisms not included in the earlier engines.

Bubniak et al., Rotary Regenerator Seal, 2,888,248
Collman et al., Regenerative Heat Exchanger, 2,937,010
Creswick et al., Gas Turbine Starting System, 2,938,338
Ricketts, Compressor Seals, 2,938,661
Collman et al., Turbine, 2,960,306
Flanigan et al., Gas Turbine Fuel System With Regenerator Temperature Compensation, 2,976,683
Zeek et al., Speed Sensor, 3,039,315
Bubniak et al., Rotary Regenerator, 3,057,604
Collman et al., Regenerative Gas Turbine, 3,077,074
Collman et al., Gas Turbine Regenerator Drive, 3,093,009
Spreitzer et al., Transmission, 3,093,010
Amann et al., Regenerative Gas Turbine, 3,095,700
Flanigan et al., Gas Turbine Fuel Nozzle Cooling, 3,095,706
Flanigan et al., Gas Turbine Fuel Nozzle Air Supply System, 3,095,707
Amann et al., Regenerative Gas Turbine, 3,116,605
Bubniak et al., Regenerative Heat Exchanger, 3,185,603
Flanigan et al., Re-expansion Gas Turbine With Power Transfer Between Turbines, 3,237,404

The engine of the present invention includes the power transfer feature of Patent No. 3,237,404, which contributes greatly to the economy and usefulness of the engine. It embodies a new type of case or housing including provisions for protecting the housing from hot gas so that the housing is made by die casting from aluminum alloy, no high temperature resistant material being required. The engine differs from that of the 3,077,074 patent in the mounting of the regenerator which, in this invention, is a single radial-flow or drum matrix rotating about a vertical axis. The matrix is driven frictionally rather than by gearing and is located by two rollers engaging the periphery to locate the axis of the matrix and by a single roller engaging the rim to locate the matrix axially. The frictional loading is controlled to ensure adequate friction during starting.

The turbines have improved structure embodying the use of single castings for each nozzle diaphragm and for each wheel complete with blades. Improved provisions for cooling the turbine, together with the integral cast structure, make lower clearances feasible, and thus less leakage and greater efficiency of the turbines.

The nature and advantages of the invention, indicated generally above, and other advantageous features of the engine will be clear to those skilled in the art from the succeeding detailed description of the preferred embodiment of the invention.

Referring to the accompanying drawings, FIGURE 1 is a cutaway axonometric view of an engine as viewed from the inlet or compressor end.

FIGURE 3 is a rear elevation view taken on the plane indicated by the line 3—3 in FIGURE 2 and with parts cut away.

FIGURE 5 is an enlarged view of a portion of FIGURE 2 showing the turbine structure.

Figure 1:
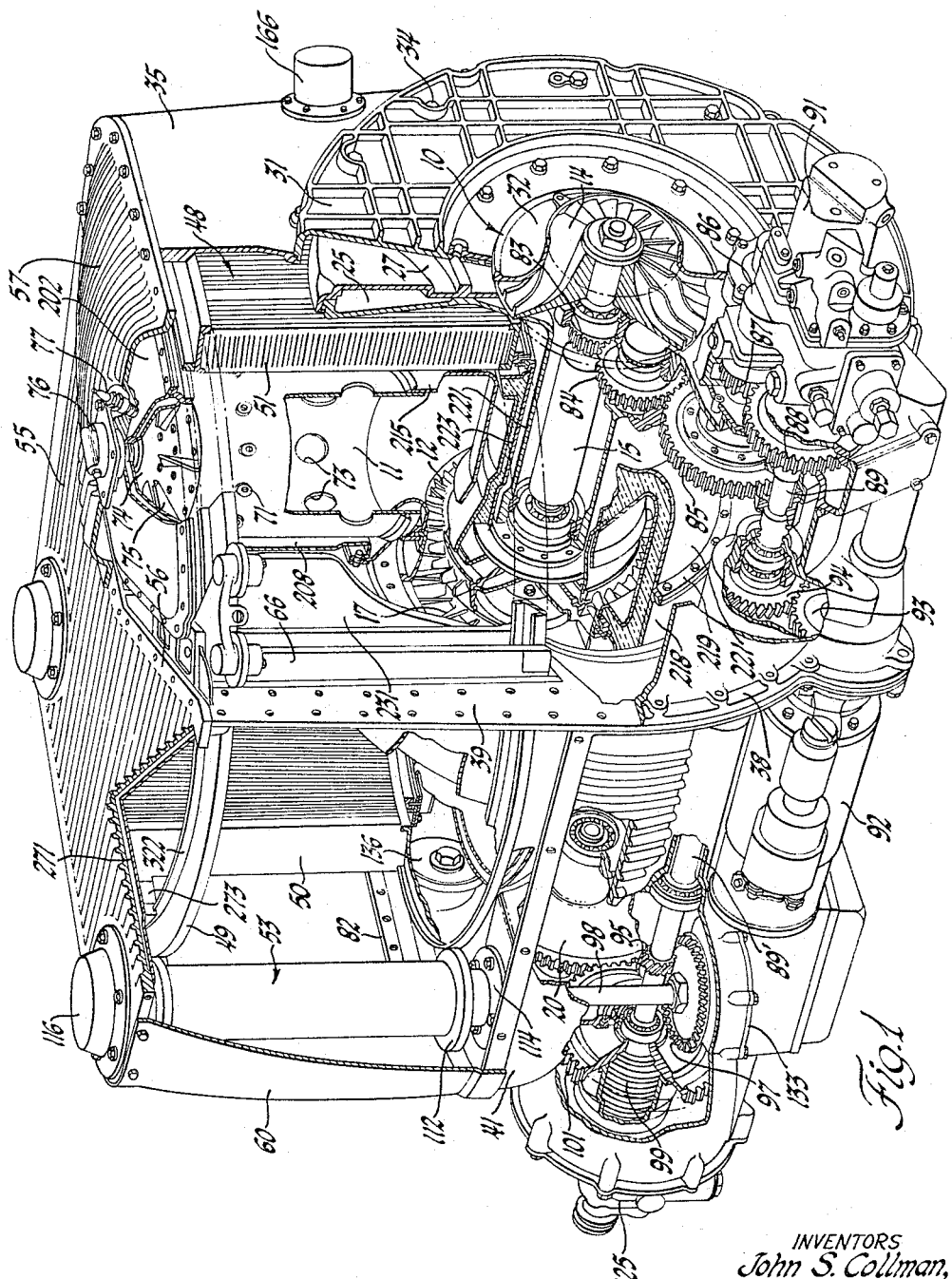
Figure 2:
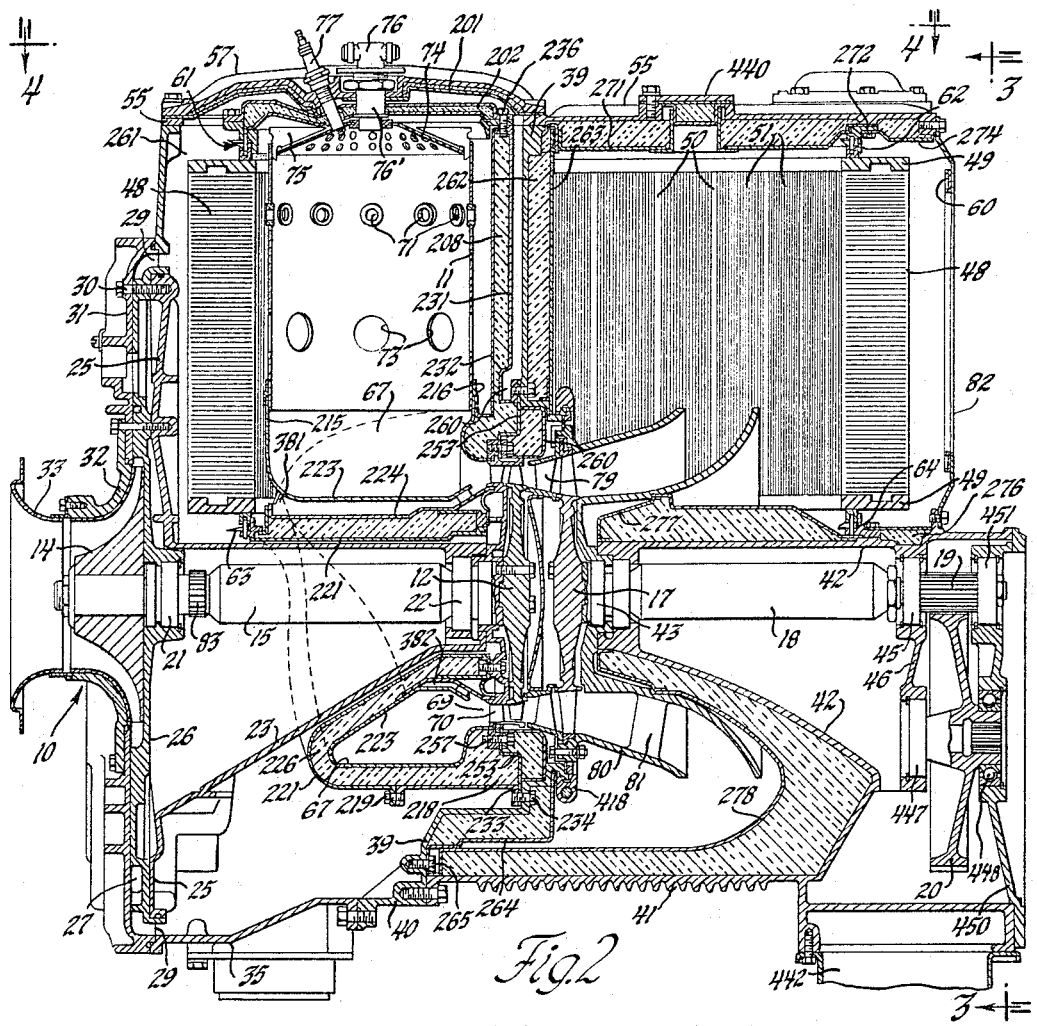
FIGURE 2 is a vertical sectional view taken on the plane containing the axis of the turbines.

The overall organization of the engine is shown most completely by FIGURES 1 and 2, but reference to the other figures will aid in understanding the general structure.

The major components of the engine include a compressor 10, a combustion chamber 11, and a turbine wheel 12 which drives the rotor 14 of the compressor 10 through a shaft 15. The parts so far described are the principal elements of a gas generator, which is a major subassembly of the entire engine and which provides motive fluid for a power turbine. The power turbine comprises a wheel 17 mounted on a shaft 18 on which is a pinion 19 driving a power output gear 20. Gas generator shaft 15 is supported in bearings 21 and 22 within a shaft housing 23 having a circular flange 25 at its forward end. Bearing 21 is mounted in a circular compressor rear plate 26 which is the rear cover of the compressor and also defines diffusing passages such as 27 extending spirally from the compressor rotor and discharging through the annular outlet 29. Bearing 22 is mounted in the rear end of shaft housing 23. The flange 25 and diffuser plate 26 are connected by a ring of bolts 30 to a compressor front cover 31 of circular outline to the forward face of which is fixed the shroud 32 for the compressor rotor. An air inlet fitting 33 is bolted to the shroud 32. The compressor front cover 31 is secured by an outer ring of bolts 34 to the front case or housing 35 of the engine. The lower part of the front case is substantially half of a cylinder concentric with the axis of the shaft 15 and extending rearwardly from the compressor to a point somewhat forward of the turbine wheel 12. The upper portion of the front case 35 extends above the compressor front cover and is approximately a surface generated by a vertical line.

Figure 4:
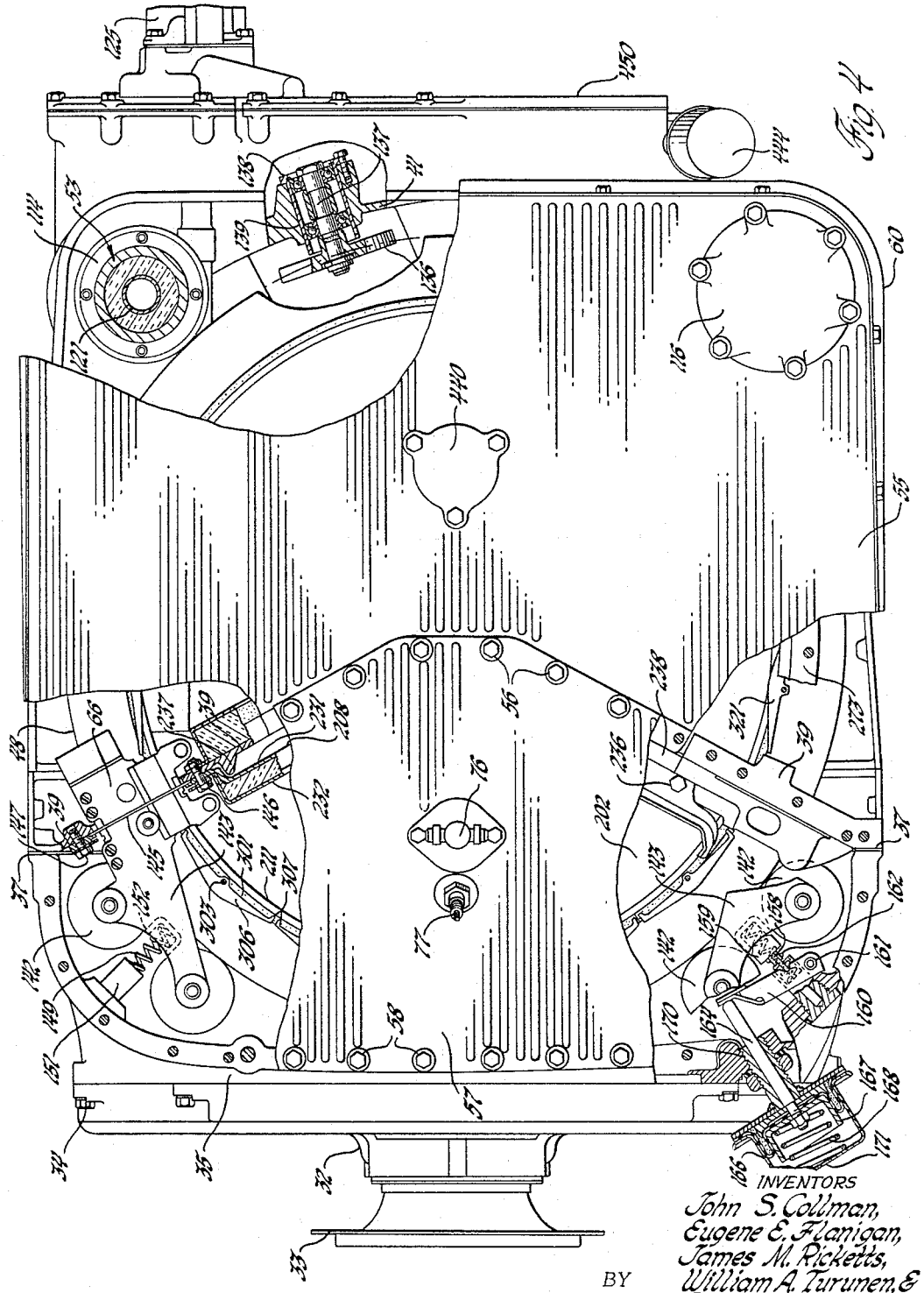
FIGURE 4 is a plan view taken on the plane indicated in line 4—4 in FIGURE 2 and with parts cut away.

As seen most clearly in FIGURE 4, the walls of the front case 35 curve backwardly to rear faces 37 aligned with the rear face of the lower portion of the front case. The front case thus has a bolting flange 38 at its rear edge extending in a U-shape from the top of the engine at one side, under the gas generator, and up the other side. A generally vertical bulkhead 39 bolts to this flange. This bulkhead defines the rear wall of the plenum into which the compressor discharges, which may be termed the high pressure chamber. The forward and side walls of this chamber are defined by the front case 35 and the fixed part of the compressor. The bottom of the plenum is defined by the lower part of the front case and a forwardly offset lower outer portion 40 of the bulkhead.

The lower edge of the bulkhead is connected also to a power turbine housing 41, which is a generally bowl-shaped or quarter-spherical structure forming the support for the power turbine and including a generally conical shaft support 42. This support extends forward to the bearing 43 for the power shaft 18 adjacent the power turbine 17. The rear bearing 45 for the power turbine shaft is mounted in a wall 46 at the rear of the power turbine housing. The power turbine housing 41 thus supports the power turbine in coaxial alignment with the gas generator turbine 12.

The regenerator of the engine comprises a matrix drum 48 which rotates slowly about a vertical axis. The drum 48 may be of the general type disclosed in Patent No. 3,181,603. Two end rings 49 are connected by angularly spaced stiffeners 50 which have packs of heat transfer shims or elements 51 between them. The total structure is extremely porous to radial air flow and can exchange heat very rapidly to or from gas flowing through it. The matrix is located and supported in the engine by structure including two support roller assemblies 53 and 54 against which the rims 49 bear. These roller assemblies, which will be called rollers for conciseness, extend vertically upward from the rear end of the power turbine housing 41. The upper ends of the rollers are supported in a regenerator cover 55 which lies over the regenerator and closes the upper end of the hot gas chamber. A ribbed front cover 57 overlies a large opening in the regenerator cover 55 and extends from the bulkhead to the upper edge of the front cover 35. Cover 55 and 57 are fixed by bolts 58 to the front cover 35 and by bolts 56 to the upper edge of the bulkhead 39. The rollers 53 and 54 are supported in two structures extending rearwardly from the bulkheads: the power turbine housing 41 at their lower ends, and the regenerator cover 55 at their upper ends.

The engine housing is completed by a lightweight sheet metal exhaust cover 60 which is bolted to the upper margin of the rear housing, the outer margin of the regenerator cover, and to the bulkhead at its forward edges. Thus, the lower pressure chamber is bounded by the rear turbine housing, the bulkhead, the regenerator cover, and the exhaust cover.

Each rim of the regenerator is engaged by a ring of seals, which may be termed bypass seals, and which seal between the matrix and the fixed structure. As appears in FIGURE 2, these are a front upper bypass seal 61, a rear upper bypass seal 62, a front lower bypass seal 63, and rear lower bypass seal 64. The details of these will be enlarged upon later.

As is most clearly apparent from FIGURE 4, the matrix 48 passes through the bulkhead 39 at two points. To prevent leakage of gas through the bulkhead, a primary or bulkhead seal 66 is provided at each of these points. These seals may be generally much like those disclosed in U.S. Patents 2,888,248, and 3,057,604. They will not be described in detail. Each of the two seals 66 comprises a generally rectangular frame which is disposed around the matrix and which fits within a slot or opening in the bulkhead when the regenerator matrix is put in place. These seals are capable of shifting position to accommodate relative expansion of parts of the engine.

The combustion chamber 11 is disposed in the upper part of the case between the regenerator matrix 48 and the bulkhead 39, with its axis vertical. The open lower end of the combustion chamber fits into an opening in the upper side of a transition section or nozzle box 67, which terminates in an annular outlet 69 feeding through the first or gas generator turbine nozzle 70. The cylindrical body 11 has openings 71 for primary combustion air and 73 for dilution air, and has a slightly conical dome 74 which has ribs 75 slidably fitting inside the wall 11. The dome includes a ferrule 76' fixed to the front cover 57, which ferrule surrounds a fuel nozzle 76 projecting through the dome. Igniter 77 also projects through the dome. The fuel nozzle and igniter are mounted in the front upper cover 57.

In operation of the gas generator, the air compressed by the compressor flows into the plenum or cool compressed air zone surrounding the matrix forward of the bulkhead, through the matrix where it is heated, and into the combustion chamber where it is further heated from comustion of fuel. The combustion products flow from the combustion chamber through the nozzle box and first stage nozzle, driving the turbine wheel 12, which drives the compressor. The exhaust from the gas generator turbine is the motive fluid for the power turbine. This turbine comprises a nozzle diaphragm 79 and the turbine wheel 17 from which the gases flow into an annular diffuser 80. The diffuser has diverging inner and outer walls connected by struts 81. The turbine thus conducts the gases from the forward side of the bulkhead into the low pressure chamber at the rear of the bulkhead. These gases flow radially outward through the matrix and into the exhaust chamber outside the matrix. An opening 82 in the rear of the exhaust cover 60 provides for connection of an exhaust pipe.

This concludes the general description of the engine and should serve as an introduction to the succeeding more detailed description of certain parts of the engine.

Before proceeding to these, however, it may be desirable to mention briefly the accessory and power transfer apparatus. A gear 83 on gas generator shaft 15 drives an idler gear 84 (FIGURE 1), which in turn drives gear 85. This gear includes a speed sensor of the type described in the Zeek et al. Patent 3,039,315, and it also constitutes the input to a torquemeter 86 which senses the torque transmitted from gear 85 to gear 87, which is coaxial with it, and which in turn drives gear 88 at the forward end of a power transfer shaft 89. The torquemeter may be substantially as described in application Serial No. 178,121 referred to above. The engine fuel pump and fuel control assembly 91 is mounted on the front of the engine and driven by the front end of shaft 89. A starter motor 92 bolted to a flange of the front case and bulkhead is coupled to the power transfer shaft through gears 93 and 94 so that it may drive through the train of gears, just described, to crank the gas generator. The power transfer shaft comprises a rear section 89' splined into the hub of gear 94, which hub couples shaft sections 89 and 89'.

A helical pinion 95 on the power transfer shaft 89' meshes with a gear 97 fixed to a vertical shaft 98, which is splined to the lower end of the matrix drive roller 53. The power transfer shaft 89' provides the input to a multiple-plate power transfer clutch 99 mounted within the power turbine housing 41. The clutch couples shaft 89' to a gear 101 which meshes with the gear 20 through which the engine power output is transmitted to any suitable output shaft. Controlled engagement of the clutch 99 makes possible transfer of power from the gas generator turbine to the output shaft and also makes it possible to use the compressor to brake the power output shaft. The principles, structure, and operation of the power transfer mechanism of which the torque sensor, power transfer shaft, and power transfer clutch are elements, are fully described in application Serial No. 178,121. As stated previously, one of the significant features of the engine described here is the physical integration of the power transfer system into the structure of the engine.

*Regenerator supporting and driving arrangement*

As previously stated, the regenerator matrix 48 is an annulus of rectangular cross section adapted for radial flow of gas through it. It is rotated slowly, passing through the main seals 66 in the bulkhead 39. The matrix has rims 49 which bear against the support roller assemblies 53 and 54. The roller assembly 53 is driven by the shafts 89' and 98.

Referring now to FIGURES 3 and 4, the drive roller 53 comprises a cylinder 110 having flanges at each end to which are bolted driving rings 111. A hollow stub shaft 112 is welded to the lower end of cylinder 110. Shaft 112 is mounted in a ball bearing 113 supported in a cage 114 bolted to the upper surface of the rear turbine housing. The interior of shaft 112 is splined to mate with the splined upper end of the drive shaft 98. The upper end of roller 53 is supported by a cap 116 bolted to the upper surface of the regenerator cover 55. This cap 116 is integral with a hollow boss 117 which fits within a ball bearing 118 mounted in the upper end of roller 53. A seal 119 is disposed above the bearing. A thin sheet metal tube 121 is disposed within the roller 53, fitting in the upper end and fitting in a socket in the shaft 112. Insulating material 122 fills the annular space between the cylinder 110 and the tube 121.

The roller 54 is not driven, but is merely a freely rotatable supporting roller. It may be identical to roller 53 except that the lower end shaft 112' is different from the shaft 112, as there is no provision for a drive shaft at this point. Both of the shafts 53 and 54 have similar provisions for lubrication. Referring to shaft 54, the cap 116 has a central passage 124 connected by a pipe (not shown) to a suitable source of oil under pressure such as pump 125 mounted behind the power transfer clutch and driven by the power transfer shaft 89'. An orifice 127 in the nose of the cap discharges oil to bearing 118 and a second jet 128 delivers oil to the inside of tube 121 which flows to the lower end of the roller. Some of this oil is discharged through lateral passages 129 to the ball bearing 113. Similar passages 129 are provided in the end 112 of roller 53. Here the oil flows past the splines in the upper shaft 198 and through passages 129 to the bearing. In this case, oil also flows downward through the hollow shaft 98 and out a metering opening 131 at the bottom of the shaft to lubricate the bearing 132 which supports the lower end of shaft 98. This bearing is supported in a cage 133 bolted to the lower surface of the rear turbine case.

It will be noted that the rings 111 on the support rollers engage the radially outer surface of the rings 49 of the matrix and thus locate the matrix against movement transverse to its axis, but permit it to expand or to move along its axis. The matrix is located axially by roller 136 (FIGS. 3 and 4). This roller is bolted to a shaft 137 supported in ball bearings in a cage 138 mounted in a bore 139 in the rear wall of the turbine case 41. Roller 136 is merely an idler which engages the lower rim of the matrix and supports it. The roller is offset from the centerline of the engine to leave room for the power turbine shaft 18. The force of gravity on the matrix holds it against roller 136. This same force would tend to pull the upper rim of the matrix away from support rollers 53 and 54, but this is compensated for. As previously stated, the matrix passes through two primary or bulkhead seals 66, which seals may be of the type described in the Bubniak et al. Patent No. 3,057,604 referred to above. Each seal assembly includes two rollers 142 at each end mounted on a bracket carriage 143. The rollers 142 roll on the periphery of the rings 49 and thus align the primary seal with the matrix. This is similar to the structure for aligning the seal with the matrix described in Patent No. 3,057,604, except that all the rollers are located on the cool side of the bulkhead. The seal 66 is mounted in a slot in the bulkhead 39, with a shim stock secondary seal 145 bridging the gap around seal 66. Bolts 146 and 147 secure the secondary seal. The rollers 142 are biased against the matrix by two compression springs (one at each end of the seal assembly) reacting against sockets 151 mounted in the engine front housing 35 and seated in sockets 152 in carriage 143. This force is transmitted from the rollers 142 to the matrix and acts to bias the matrix against the rollers 53 and 54. When the engine is in operation, there is still a greater force, due to the pressure drop through the turbine, which is exerted over the cross-sectional area of the matrix. Thus there is ample force pressing the matrix against the drive roller 53 to assure adequate friction to rotate the matrix.

When the engine is being started, however, the compressor discharge pressure is low and the force pressing the matrix against the drive roller 53 may not be sufficient. Therefore, means to provide additional frictional force is provided, which biases the set of rollers 142 which are located substantially diametrically opposite the drive roller 53 so as to increase the driving friction. It would be possible to maintain this additional loading force during normal operation of the engine, but it would lead to undue wear of the primary seal roller bearings; therefore, the additional loading is put on by means which is disabled when the compressor is in normal operation. The mechanism by which this is effected comprises a bar or yoke structure 158 having loops 159 at its ends surrounding normal loading springs 149 which loops engage bracket 143. A lever 160 is rotatable about a pivot 161 on the front cover 35. This lever is of channel section and has notches 162 in the flanges which provide a seat for the edge of the yoke 158. The end of lever 160 is engaged by a rod 164 extending from an expansible-chamber motor 166. The motor is a simple device including a piston 167 connected to the rod 164 and biased by a relatively strong compression spring 168.

The air motor is mounted by a threaded hollow boss 170, which is threaded into the front case 35 and secured by a jam nut. The rod 164 is guided in this boss, which provides clearance for transmission of compressor discharge pressure from within the engine to the rear face of piston 167. The forward face of the piston is vented to atmospheric pressure through an opening 171 in the casing of motor 166. The device is so constituted that the normal compressor discharge pressure above that at engine idling or low power setting will overcome spring 168 and take off the additional loading.

The foregoing completes the description of the regenerator except for the bypass seals, description of which will be deferred.

*Heat shielding and insulation*

An important feature of the engine lies in the arrangements to control heating of the engine housing. These include means to insulate the combustion apparatus and nozzle box to prevent much conduction or radiation of heat from these parts to the outer case or housing of the engine and to allow compressor discharge air to flow freely over the surfaces of the housing. In the low pressure part of the engine also the structural parts of the housing are insulated to keep them at a low and even temperature notwithstanding the relatively hot exhaust gases therein. The bulkhead is insulated on its rear face from the turbine exhaust gases, is shielded by a sheet of heat insulating material from the combustion chamber at the front, and has its front surface cooled by compressor discharge air. The principal valuable results of these features are (1) a cool engine housing which can be and is made of die-cast aluminum alloy, no high temperature resistant material being required; (2) low heat losses by external radiation and by conduction through the bulkhead; and (3) maintenance of low and substantially equal temperature in the rear turbine case and regenerator cover so that the shafts of the support rollers 53 and 54 remain substantially parallel. The front case of the engine and the regenerator cover are not insulated or particularly cooled, but these are exposed to the outer or relatively cool face of the regenerator matrix. The hot parts of the engine are the radially inner part of the matrix and those parts of the engine in contact with the motive fluid from the time it is heated by the regenerator matrix until the time it is discharged into the matrix.

It may be logical to consider these insulating structures more or less in the order that they are encountered as air flows through the engine. The front cover 57 has fixed to its lower surface a layer of insulating material 201 (FIG. 2). The outer surface of cover 57 is ribbed to aid in dissipating heat. Also, the underside of the cover, that is, the insulating shield 201, is in communication with compressor discharge air, which fills a relatively shallow space between the insulating cover 201 and a combustion chamber cover 202. As shown more clearly in FIGURES 1 and 2a, the combustion chamber cover 202 comprises a sheet metal upper plate 203, a relatively thin lower metal sheet 204 and heat insulating material 206 such as ceramic fiber filling the space between the two sheets. Cover 202 shields the engine front cover 57 from radiation of heat from the combustion chamber and it also closes off the top of an enclosure which prevents air from reaching the combustion chamber except through the matrix 48. The somewhat V-shaped rear margin of cover 202 is fixed to the upper margin of a bulkhead insulating shield 208, which encloses the combustion chamber at the rear somewhat as the regenerator matrix encloses it at the front. The front edge of the cover 202 is fixed by bolts 209 (FIGURE 2a) to a front upper bypass seal support ring 211, which extends just above the upper surface of the matrix between the primary seals 66 and is concentric with the matrix. This is the support of the front upper bypass seal 61.

The combustion chamber 11 rests on the transition piece or nozzle box 67. The nozzle box is fixed to the first stage turbine nozzle diaphragm 70, which in turn is fixed to the gas generator shaft support 23. The nozzle box is generally annular, being larger in cross section at the upper part where the gas enters than at the lower part. An upwardly projecting cylindrical portion 215 of the nozzle box receives the combustion liner, the latter having a flange 216 which rests on the nozzle box. The portions of the nozzle box which lie below the regenerator are heat insulated by an assembly which includes the lower part of the heat shield 208 between the combustion chamber and the bulkhead 39. The lower part of the heat shield includes a semi-cylindrical structure 218 which is disposed around the rear portion of the nozzle box. This is fixed at a bolting flange 219 to a formed sheet metal structure 221 enveloping the forward end of the nozzle box up to the regenerator and also loosely enclosing the part of the shaft housing within the nozzle box. Thus, as seen in FIGURE 2, the generally conical wall 223 forms a part of the nozzle box and the generally conical wall 221, which is recurved to the bolting flange 219, constitutes an outer cover to contain insulating material 226 which surrounds the nozzle box and shields the shaft housing. The wall 223 which contains the combustion gases is spaced in part from the insulating material by an inner wall 224. Turbine cooling air is delivered through the annular gap between walls 223 and 224, as will be explained. The structure 221 includes lateral extensions reaching to the arcuate support ring for the lower front bypass seal 63, this support ring being similar to the support ring 221 for the upper bypass seal. These prevent flow into the combustion chamber bypassing the matrix.

The bulkhead shield 208 is a double-walled structure including a rear sheet 231 which is spaced from the bulkhead and a front sheet 232, insulating material being disposed between the two sheets. The rear sheet 231 is integral with the portion 218 of the nozzle box shield and includes a circular flange 233 which is fixed to the bulkhead by bolts 234. The rear sheet 231 of the bulkhead heat shield has a flange at the upper end which is fixed by bolts 236 to the combustion chamber cover 202. The side margins of sheets 231 and 232 are fixed to the side margins of the bulkhead by the bolts 146 (FIGURE 4) which hold the secondary seals in place. It will be noted that the bulkhead has a vertical rib adjacent the row of bolts 146 which spaces the insulating cover 203 from it, leaving a substantial air space 238 between the bulkhead 39 and the shield. This space is cooled by compressor discharge air circulating through it and over the top of the combustion chamber cover 202, as will be described later.

It will be seen from the foregoing that the front side of the combustion chamber and the upper part of the nozzle box are enclosed by the regenerator. The lower part of the nozzle box is insulated, and an insulating shield is disposed between the bulkhead and the combustion chamber and between the combustion chamber and the front cover 57. There is air space between these heat shields and the engine covers and bulkhead.

A sheet metal ring 253 seals against leakage through the bulkhead outside the turbine. Ring 253 is held in place by the bolts 234 and is clamped between two rings 254 and 256 by a circle of bolts 257 threaded into ring 254. An annular flange 258 on the outer shroud of first stage nozzle 69 is held loosely between rings 253 and 254. An additional annulus of heat insulating material contained by a flanged ring 260 is disposed in an offset of the bulkhead between the ring 253 and the bulkhead and surrounding the turbines.

This completes the description of the parts which insulate the bulkhead and nozzle box.

To recapitulate, the bulkhead insulating structure includes an upper portion which lies immediately ahead of the bulkhead and spaced from it, and a lower portion which lies against the bulkhead adjacent the turbines, around an annular flange of the bulkhead and the rear outer part of the nozzle box. The forward outer portion and radially inner portion of the nozzle box are covered with insulating material retained by a separate piece 221 held by the bolts 219. Air discharged by the compressor into the space around the nozzle box cover 218 has access to the front of the bulkhead through the space or gap 260 immediately ahead of the flange 233. The edge of the heat shield is held closely against the bulkhead by the bolts 146 preventing escape of air in this direction so its flows upwardly back of the heat shield 208 and over the top of the combustion chamber cover 202 to the upper front of the engine where it proceeds through the gap 261 into the space between the matrix and front cover and then flows through the matrix into the combustion chamber.

Considering now the low pressure portion of the engine rearward of the bulkhead 39, the rear face of the bulkhead is insulated by material 262 retained by a plate 263 which extends parallel to and spaced from the upper part of the bulkhead and has a forward flange 264 around the lower part of the bulkhead. This shield is held to the bulkhead by bolts 265. It may be noted that this heat shield fits around the outside of the offset of the bulkhead the inside of which contains the annular heat shield 260.

The regenerator cover plate 55 has insulation applied to it which is contained by a first sheet metal retainer 271 over the area between the arcuate support for the rear upper bypass seals 62 and the bulkhead. The retainer 271 is of sheet metal and is supported at the front end on the bulkhead heat shield 263 and around the outer edge by the arcuate row of bolts 272 which also mount the support ring 273 of the rear bypass seals. These bolts 272 also support a retainer 274 for insulating material which insulates the rear cover outwardly of the matrix. The lower rear bypass seals 64 are mounted in a support ring similar to the ring 273 which is mounted at the edge of arcuate opening in the upper surface of the rear turbine housing 41. The outer part of this surface is protected by thermal insulating material 276.

The major part of the internal area of the rear turbine housing is defined by its outer (lower and lateral) generally quarter-spherical wall and by the rear turbine support 42. Insulation applied to these surfaces is retained by a conical sheet metal ring 277 fitting inside the diffuser 80 and a liner 278 fitting over the shaft support and around the interior of the rear turbine housing 41.

It will thus be seen that the hot gases discharged from the turbine through the diffuser 80 flow into the space defined by the bulkhead rear heat shield, the rear engine case heat shields and the regenerator cover heat shield, and by virtue of the bypass seals between these structures and the regenerator matrix are constrained to flow outwardly through the matrix into the exhaust cover 60.

Bypass seals

Figure 2A:
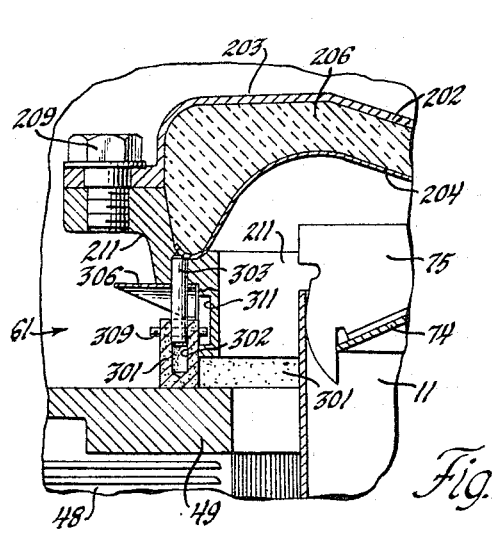
FIGURES 2a and 2b are enlarged views of portions of FIGURE 2 illustrating the bypass seals.

The bypass seals which have been referred to generally are shown principally in FIGURES 2, 2a, 2b, and 4. These seals slidably engage the outer face of each of the matrix end rings 49. The seals must be yieldable to allow for expansion and distortion of the parts, must withstand high temperature, and should have low friction and low leakage. It reduces the efficiency of the regenerator to have any of the air or combustion products bypass the matrix. The upper and lower front bypass seals are of one type. The upper and lower rear bypass seals are similar in principle but slightly different in structure. The reason for this lies in the fact that the seals are mounted to engage radial surfaces of the support rings in such a way that the pressure drop across the matrix biases the segments of the seal against the support ring. Preferably, there are approximately fifteen arcuate seal segments to cover the entire perimeter of the matrix exclusive of what lies within the primary seals. Referring to FIGURES 2a and 4, the arcuate seal support 211 defines a forward cylindrical surface against which curved sealing segments or blocks 301, which are rectangular in cross section, are biased by the pressure drop across the matrix. Each seal block 301 has a central vertical bore 302 within which a locating pin 303 pressed into the support ring 211 fits slidably. A leaf spring 306 bears at its center against a horizontal surface of the support ring and has tongues 307 at the ends which bear against the seal block 301 adjacent the ends thereof. In order to hold the blocks from sliding off the pins of the upper seal when the assembly of the seals against the matrix is completed, two small pins 309 are fixed in the seal block and extend through it perpendicularly to the supporting pin 303. The inner ends of these pins 309 are received in recesses 311 in the support. These slots allow the seal blocks to adjust up and down, but the pins engage the side of recesses 311 to prevent the seal block 301 from sliding off the pins 303.

In operation, the seal block is biased against the matrix by spring 306 and biased against the support by the modest pressure drop through the regenerator.

Figure 2B:
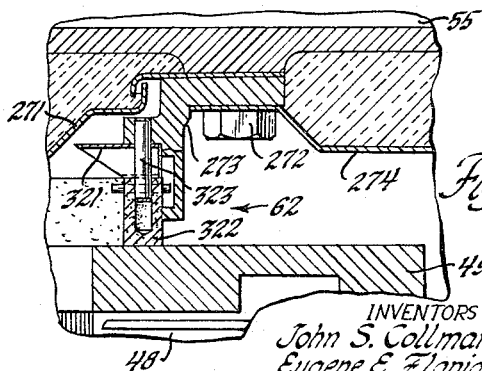

The rear bypass seals as shown particularly in FIGURE 2b are similar in principle. Here the seal blocks 322 and supporting parts are mounted inside the support ring 273, so the configuration of the parts is somewhat different. The outline of the biasing spring 321 will be apparent from FIGURE 4. The seal block 322 is mounted on a guiding pin 323 and is prevented from falling off this by a pin and slot arrangement as described with respect to the forward bypass seals. The operation is the same as that of the forward bypass seals.

Turbine structure and cooling

To recapitulate briefly what has been said about the structure of the turbines, referring to FIGURES 2 and 5, the engine comprises a gas generator turbine having a nozzle diaphragm 70 and a turbine wheel 12. It also comprises a coaxial power turbine having a nozzle diaphragm 79 and a turbine wheel 17. The outlet 69 of the nozzle box supplies motive fluid through the vanes 350 of the first stage nozzle, the blades 351 of the first stage turbine, the vanes 352 of the second stage nozzle, and the blades 353 of the second stage or power turbine into the diffuser 80 from which it flows through the matrix and out the exhaust.

Proceeding to the further description, the turbine wheels 12 and 17 are piloted into the ends of the shafts 17 and 18, respectively, and attached by bolts. Seals 356 and 357 are provided between the turbine wheels and the bearings 22 and 43, respectively. Considering now the structure of the first stage turbine nozzle, it should be pointed out that the section of the nozzle in FIGURE 5 is taken on a plane departing from that of FIGURE 2 in order to show air cooling passages in the nozzle diaphragm and to illustrate a slit in the outer shroud. This nozzle diaphragm 70 comprises a central boss 360 which engages bearing 22 and mounts the seal 356. This boss is piloted into the rear end of the shaft support 23 and bears against the end of the shaft support. Four bolts (not shown in this section) extend through the web of the diaphragm and into the end of the shaft support, fixing the diaphragm to the shaft support. The web 361 of the diaphragm continues to the inner shroud 362 which is connected by the vanes 350 to the outer shroud 363. This entire structure is an integral precision casting. The flange 258, which is coupled through the ring 253 to the bulkhead for sealing, extends from the outer shroud 363. The outer shroud is extended rearwardly to constitute the outer shroud 364 of the first stage turbine wheel.

For cooling, compressor discharge air not passed through the matrix flows through the annular passage 366 between the shaft support and the inner wall 221 of the insulating cover for the nozzle box. This air flows into an annular recess 367 in the forward face of the diaphragm and through slots 368 into an annular space 371 immediately within the inner shroud 362. From this space the cooling air is metered through four holes 372 to the rear face of the diaphragm from which it flows out through the narrow gap 373 between the diaphragm and the turbine wheel 12 cooling the rim of the wheel 12.

The nozzle box 67 is fixed to the diaphragm 70 by bolts (not shown) passing through the web 361 and into a ring 374 welded to the structure of the nozzle box. The forward face of the chamber 371 is closed by an air-blocking sheet metal ring 376 which engages the inner shroud of the nozzle and is held between the diaphragm and the ring 374.

The engine also embodies means for cooling the blade roots by a film of air washing over the rim of the wheel and the blade roots. This is a different air circuit and is provided in such manner as to minimize thermal shock upon starting or accelerating the engine. For this purpose, the air which bathes the blade roots is air which has passed through the regenerator. When the engine is started and the engine regenerator is cool, the air passing through it is cooler relative to the motive fluid than in normal operation. In starting up, there is little heating of the air by the regenerator and most of the heating is by fuel. In normal operation, after the regenerator is heated, the amount of fuel is less. Thus as the regenerator heats up, the air discharged through it heats up much more gradually than the motive fluid delivered to the turbine, which has been supplied sufficient fuel to bring its temperature up to operating level regardless of the lack of heat from the regenerator.

This idea is carried out by providing a double wall on the inner periphery of the nozzle box and supplying air which has passed through the regenerator but not the combustion chamber into the double wall, from which it flows as a film over the turbine wheel blade roots. Referring to FIGURE 2, an air inlet 381 is provided adjacent the regenerator between the two walls 223 and 224 which define the inside of the nozzle box. Air entering at 381 flows through the generally annular passage 382 between these walls, which are fixed together by rivets 383 and spaced by blocks 384. The air ultimately discharges at 386 over the inner wall of the nozzle box immediately forward of the first stage vanes. It flows over the shroud 362 and provides a layer of cooling air over the bases of blades 351. As previously stated, this air is relatively cool in starting the engine and heats up somewhat gradually, thus minimizing thermal shock at the blade bases.

Of course, in normal operation, this air is cooler than the combustion chamber heated motive fluid, so it continues to have a cooling effect on the blades and wheel rim.

The outer shroud 363, 364 is not shown in section because the section here is taken along a narrow slot extending across the shroud at an angle to the shaft axis. The outer shroud is thus split into seven segments by extremely narrow slots which close when the engine is at full temperature. Thus, the higher temperature of the outer shroud as compared to the inner is taken care of and heavy stresses in the nozzle structure due to uneven expansion are avoided.

Referring now to the second stage or power turbine, the second stage nozzle diaphragm 79 comprises an inner shroud 401 and an outer shroud 402 cast integrally with the vanes 352. A sheet metal disk 403 closes the interior of the inner shroud. A peripheral locating flange 404 is provided on the outer shroud.

The second turbine wheel 17 is a unitary cast structure like the first. The blade shroud in this case is a separate unbroken ring 406 which abuts the flange 404. The diaphragm 79 and shroud 406 are supported on the diffuser 80, which in turn is mounted on the rear turbine support 42. The flange 404 and shroud 406 are received in a recess in the forward end flange 408 of the diffuser and are held against axial movement, with clearance for radial sliding adjustment, by a ring 411 held by bolts 412. The flange 404 and ring 406 are provided with six radially slotted projections on their outer margin which engage on both sides of pins parallel to the turbine axis (not shown) to provide in known manner for centering the shroud structures while allowing relative expansion between these and their support.

The diffuser 80 is also connected to the bulkhead 39 to provide a seal against diversion of exhaust gas around the outside of the power turbine. A thin metal ring 414 has its inner edge clamped between flange 408 and ring 411 and has its outer edge clamped between a flange 415 on the bulkhead 39 and a free ring 416. Flange 415 and ring 416 are clamped together with ring 414 between them by a ring clamp 418 when the engine is assembled. The V-band 418 is assembled by two tangential bolts 419. The diffuser 80 is mounted in the engine similarly to the first stage nozzle. An interior flange 431 on the front end of the diffuser is piloted into the front end of the rear turbine support 42 and held by bolts 432.

A few incidental features of the engine may be referred to briefly. FIGURES 2 and 4 show a removable plug 440 bolted into an opening in the regenerator cover 55 and insulated similarly to the cover. This plug may be provided for possible withdrawal of hot gas for vehicle heating or other purposes.

The engine includes an oil sump 442 at the rear within which is mounted the intake (not shown) for the oil pump 125. A filter pipe and breather 444 connect to this sump.

The main power output gear 20 (FIGURE 2) includes a hub mounted in bearing 447 in the web 46 of the rear turbine case. This hub is mounted also in a bearing 448 disposed in a rear cover plate 450 of the rear turbine case which cover also receives the bearing 451 at the rear of the power output pinion 19. A suitable gearbox or automatic transmission may be bolted to plate 450, with its input shaft coupled to the internal splines of gear 20. The pinion 19 which is driven by turbine 17 is straddle-mounted between the bearings 45 and 451.

The detailed description of the preferred embodiment of the invention for the purpose of explaining the principles thereof is not to be understood as limiting the invention since many modifications may be made by the exercise of skill in the art.

We claim:

1. A regenerative gas turbine engine comprising, in combination,
   a housing,
   a bulkhead extending across the housing and dividing the interior of the housing into a high pressure chamber and a low pressure chamber,
   a compressor discharging into the high pressure chamber,
   a turbine connected to drive the compressor and providing a flow path from the high pressure chamber to the low pressure chamber,
   an engine exhaust from the low pressure chamber,
   a rotary regenerator matrix rotatable about a generally vertical axis disposed in both chambers and passing through the bulkhead,
   seal means effective to direct the compressor discharge through the portion of the matrix in the high pressure chamber and to direct the turbine exhaust through the portion of the matrix in the low pressure chamber,
   combustion apparatus disposed in the flow path from the matrix to the turbine, the combustion apparatus including a combustion chamber and a transition section connecting the combustion chamber to the turbine,
   thermal insulation disposed around the combustion apparatus and spaced from the housing and bulkhead to define a cool compressed air zone supplied by the compressor to bathe the housing and bulkhead with cooling air,
   the said insulation and the matrix enclosing the combustion apparatus, air flowing from the cool air zone through the matrix to the combustion apparatus,
   thermal insulation lining the bulkhead and housing in the low pressure chamber to insulate the bulkhead and housing from the turbine exhaust gases,
   two rollers in the low pressure chamber having axes parallel to the matrix axis each frictionally engaging the periphery of the matrix at points spaced axially of the matrix,
   a location roller disposed between the first-mentioned rollers engaging the underside of the matrix to locate the matrix axially,
   the matrix being biased against the first-mentioned rollers by the pressure drop across the bulkhead and against the locating roller by gravity,
   yieldable means biasing the matrix against the first-mentioned rollers,
   means responsive to a condition indicative of the said pressure drop effective to increase the biasing effect of the yieldable means at low values of pressure drop, and
   means for driving one of the first-mentioned rollers so as to rotate the matrix.

2. A regenerative gas turbine engine comprising, in combination,
   a housing,
   a bulkhead extending across the housing and dividing the interior of the housing into a high pressure chamber and a low pressure chamber,
   a compressor discharging into the high pressure chamber,
   a turbine connected to drive the compressor and providing a flow path from the high pressure chamber to the low pressure chamber,
   an engine exhaust from the low pressure chamber,
   a rotary regenerator matrix rotatable about a generally vertical axis disposed in both chambers and passing through the bulkhead,
   seal means effective to direct the compressor discharge through the portion of the matrix in the high pressure chamber and to direct the turbine exhaust through the portion of the matrix in the low pressure chamber,
   combustion apparatus disposed in the flow path from the matrix to the turbine, the combustion apparatus including a combustion chamber and a transition section connecting the combustion chamber to the turbine, thermal insulation disposed around the combustion apparatus and spaced from the housing and bulkhead to define a cool compressed air zone supplied by the compressor to bathe the housing and bulkhead with cooling air, the said insulation and the matrix enclosing the combustion apparatus, air flowing from the cool air zone through the matrix to the combustion apparatus, thermal insulation lining the bulkhead and housing in the low pressure chamber to insulate the bulkhead and housing from the turbine exhaust gases, two rollers in the low pressure chamber having axes parallel to the matrix axis each frictionally engaging the periphery of the matrix at points spaced axially of the matrix, a locating roller disposed between the first-mentioned rollers engaging the underside of the matrix to locate the matrix axially, the matrix being biased against the first-mentioned rollers by the pressure drop across the bulkhead and against the locating roller by gravity, and means for driving one of the first-mentioned rollers so as to rotate the matrix.

3. A regenerative gas turbine engine comprising, in combination, a housing, a bulkhead extending across the housing and dividing the interior of the housing into a high pressure chamber and a low pressure chamber, a compressor discharging into the high pressure chamber, a turbine connected to drive the compressor and providing a flow path from the high pressure chamber to the low pressure chamber, an engine exhaust from the low pressure chamber, a rotary regenerator matrix disposed in both chambers and passing through the bulkhead, seal means effective to direct the compressor discharge through the portion of the matrix in the high pressure chamber and to direct the turbine exhaust through the portion of the matrix in the low pressure chamber, combustion apparatus disposed in the flow path from the matrix to the turbine, the combustion apparatus including a combustion chamber and a transition section connecting the combustion chamber to the turbine, thermal insulation disposed around the combustion apparatus and spaced from the housing and bulkhead to define a cool compressed air zone supplied by the compressor to bathe the housing and bulkhead with cooling air, the said insulation and the matrix enclosing the combustion apparatus, air flowing from the cool air zone through the matrix to the combustion apparatus, and thermal insulation lining the bulkhead and housing in the low pressure chamber to insulate the bulkhead and housing from the turbine exhaust gases.

4. An engine as recited in claim 3 in which the housing is constituted largely of aluminum, the said thermal insulation maintaining the housing at a low temperature.

5. A regenerative gas turbine engine comprising, in combination, a housing, a bulkhead extending across the housing and dividing the interior of the housing into a high pressure chamber and a low pressure chamber, a compressor discharging into the high pressure chamber, a turbine connected to drive the compressor and providing a flow path from the high pressure chamber to the low pressure chamber, an engine exhaust from the low pressure chamber, a rotary regenerator matrix disposed in both chambers and passing through the bulkhead, seal means effective to direct the compressor discharge through the portion of the matrix in the high pressure chamber and to direct the turbine exhaust through the portion of the matrix in the low pressure chamber, combustion apparatus disposed in the flow path from the matrix to the turbine, the combustion apparatus including a combustion chamber and a transition section connecting the combustion chamber to the turbine, thermal insulation disposed between the combustion apparatus and bulkhead and spaced from the bulkhead to define a cool compressed air zone supplied by the compressor to bathe the bulkhead with cooling air, air flowing from the cool air zone through the matrix to the combustion apparatus, and thermal insulation lining the bulkhead in the low pressure chamber to insulate the bulkhead from the turbine exhaust gases.

6. A regenerative gas turbine engine comprising, in combination, a housing, a bulkhead extending across the housing and dividing the interior of the housing into a high pressure chamber and a low pressure chamber, a compressor discharging into the high pressure chamber, a turbine connected to drive the compressor and providing a flow path from the high pressure chamber to the low pressure chamber, an engine exhaust from the low pressure chamber, a rotary regenerator matrix disposed in both chambers and passing through the bulkhead, seal means effective to direct the compressor discharge through the portion of the matrix in the high pressure chamber and to direct the turbine exhaust through the portion of the matrix in the low pressure chamber, combustion apparatus disposed in the flow path from the matrix to the turbine, the combustion apparatus including a combustion chamber and a transition section connecting the combustion chamber to the turbine, and thermal insulation disposed around the combustion apparatus and spaced from the housing and bulkhead to define a cool compressed air zone supplied by the compressor to bathe the housing and bulkhead with cooling air, the said insulation and the matrix enclosing the combustion apparatus, air flowing from the coil air zone through the matrix to the combustion apparatus.

7. A rotary regenerator comprising, in combination, a housing, a bulkhead extending across the housing dividing the housing into a high pressure chamber and a low pressure chamber, a regenerator matrix rotatable about a generally vertical axis in the housing and passing through the bulkhead between the two chambers when rotated, two rollers having axes parallel to the matrix axis each frictionally engaging the periphery of the matrix at points spaced axially of the matrix, the rollers being in the low pressure chamber, a locating roller disposed between the first-mentioned rollers engaging the underside of the matrix to locate the matrix axially, the matrix being biased against the first-mentioned rollers by the pressure drop across the bulkhead and against the locating roller by gravity, yieldable means biasing the matrix against the first-mentioned rollers, means responsive to a condition indicative of the said pressure drop effective to increase the biasing effect of the yieldable means at low values of pressure drop, and means for driving one of the first-mentioned rollers so as to rotate the matrix.

8. A regenerator as recited in claim 7 in which the rollers are supported at both ends by the housing.

9. A rotary regenerator comprising, in combination, a housing,
a bulkhead extending across the housing dividing the housing into a high pressure chamber and a low pressure chamber,
a regenerator matrix rotatable in the housing and passing through the bulkhead between the two chambers when rotated,
two rollers having axes parallel to the matrix axis each frictionally engaging the periphery of the matrix at points spaced axially of the matrix,
the rollers being in the low pressure chamber,
the matrix being biased against the rollers by the pressure drop across the bulkhead,
yieldable means biasing the matrix against the rollers,
means responsive to a condition indicative of the said pressure drop effective to increase the biasing effect of the yieldable means at low values of pressure drop, and
means for driving one of the rollers so as to rotate the matrix.

10. A regenerator as recited in claim 9 in which the said condition is the pressure in the high pressure chamber.

11. A rotary regenerator comprising, in combination, a housing,
a bulkhead extending across the housing dividing the housing into a first chamber and a second chamber,
a regenerator matrix rotatable about a generally vertical axis in the housing and passing through the bulkhead between the two chambers when rotated,
two rollers having axes parallel to the matrix axis each frictionally engaging the periphery of the matrix at points spaced axially of the matrix,
the rollers being both in one chamber,
a locating roller disposed between the first-mentioned rollers engaging the underside of the matrix to locate the matrix axially,
the matrix being biased against the locating roller by gravity,
yieldable means biasing the matrix against the first-mentioned rollers, and
means for driving one of the first-mentioned rollers so as to rotate the matrix.

12. A rotary regenerator comprising, in combination, a housing,
a bulkhead extending across the housing dividing the housing into a high pressure chamber and a low pressure chamber,
a regenerator matrix rotatable about a generally vertical axis in the housing and passing through the bulkhead between the two chambers when rotated,
two rollers having axes parallel to the matrix axis each frictionally engaging the periphery of the matrix at points spaced axially of the matrix,
the rollers being in the low pressure chamber,
a locating roller disposed between the first-mentioned rollers engaging the underside of the matrix to locate the matrix axially,
the matrix being biased against the first-mentioned rollers by the pressure drop acorss the bulkhead and against the locating roller by gravity, and
means for driving one of the first-mentioned rollers so as to rotate the matrix.

13. A rotary regenerator as recited in claim 7 including thermal insulating means disposed on both the high pressure chamber and low pressure chamber sides of the bulkhead so as to minimize heat transfer through the bulkhead between the said chambers.

14. A regenerator for a regenerative gas turbine engine comprising, in combination,
a housing,
a bulkhead extending across the housing and dividing the interior of the housing into a high pressure chamber and a low pressure chamber,
a source of compressed air discharging into the high pressure chamber,
means providing a flow path from the high pressure chamber and an inlet to the low pressure chamber,
an exhaust from the low pressure chamber,
a rotary regenerator matrix rotatable about a generally vertical axis disposed in both chambers and passing through the bulkhead,
seal means effective to direct the compressed air from the source through the portion of the matrix in the high pressure chamber and to direct the gas from the said inlet through the portion of the matrix in the low pressure chamber,
thermal insulation disposed within the high pressure chamber and spaced from the housing and bulkhead to define a cool compressed air zone supplied by the source to bathe the housing and bulkhead with cooling air,
thermal insulation lining the bulkhead and housing in the low pressure chamber to insulate the bulkhead and housing from the gases flowing from the inlet to the exhaust,
two rollers in the low pressure chamber having axes parallel to the matrix axis each frictionally engaging the periphery of the matrix at points spaced axially of the matrix,
a locating roller disposed between the first-mentioned rollers engaging the underside of the matrix to locate the matrix axially,
the matrix being biased against the first-mentioned rollers by the pressure drop across the bulkhead and against the locating roller by gravity,
yieldable means biasing the matrix against the first-mentioned rollers,
means responsive to a condition indicative of the said pressure drop effective to increase the biasing effect of the yieldable means at low values of pressure drop, and
means for driving one of the first-mentioned rollers so as to rotate the matrix.

References Cited by the Examiner

UNITED STATES PATENTS

| | | | |
|---|---|---|---|
| 3,116,605 | 1/1964 | Amann et al. | 60—39.51 |
| 3,143,166 | 8/1964 | Williams et al. | 165—9 |
| 3,167,914 | 2/1965 | Savonuzzi | 60—39.51 |
| 3,177,928 | 4/1965 | Tumavicus | 165—9 |

MARK NEWMAN, *Primary Examiner.*

RALPH D. BLAKESLEE, *Examiner.*

UNITED STATES PATENT OFFICE
CERTIFICATE OF CORRECTION

Patent No. 3,267,674                            August 23, 1966

John S. Collman et al.

It is hereby certified that error appears in the above numbered patent requiring correction and that the said Letters Patent should read as corrected below.

Column 3, line 29, for "Cover" read -- Covers --; line 33, for "bulkheads" read -- bulkhead --; line 40, for "lower" read -- low --; column 4, line 6, for "comustion" read -- combustion --; column 8, line 37, for "its" read -- it --; column 9, line 75, strike out "the", first occurrence; column 12, line 37, for "location" read -- locating --; column 14, line 53, for "coil" read -- cool --; column 15, line 59, for "parellel" read -- parallel --; column 16, line 1, for "acorss" read -- across --.

Signed and sealed this 26th day of September 1967.

(SEAL)
Attest:

ERNEST W. SWIDER                                 EDWARD J. BRENNER
Attesting Officer                               Commissioner of Patents